Generator voltage

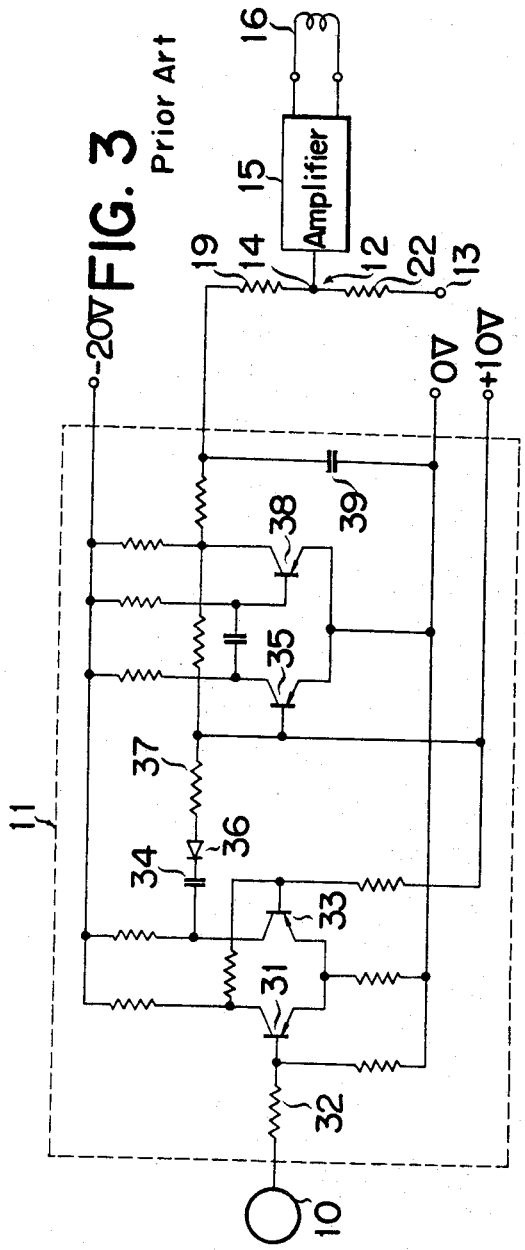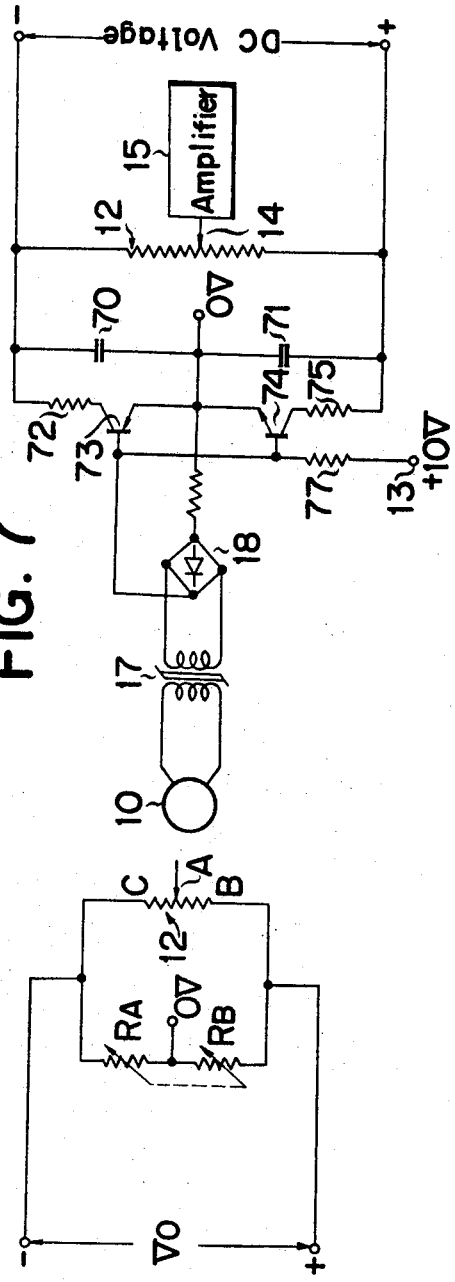

Output voltage of Schmitt trigger circuit

Terminal voltage of condenser 58

Output pulse of monostable multivibrator

Terminal voltage of condenser 66

United States Patent Office 3,418,528
Patented Dec. 24, 1968

3,418,528
APPARATUS FOR DETECTING ROTATING SPEED
Junichi Watanabe and Mitsuo Matsumoto, Tokyo, Japan, assignors to Tokyo Shibaura Electric Co., Ltd., Kawasaki-shi, Japan, a corporation of Japan
Filed May 19, 1965, Ser. No. 457,077
5 Claims. (Cl. 317—5)

ABSTRACT OF THE DISCLOSURE

An A.C. voltage synchronized with a rotary speed is converted to pulses having a constant width and occurring at each alternation of the voltage; a tapped resistor has a potential applied thereacross so that the tap point will have a predetermined potential with respect to an end of the resistor at quiescent state; and parallel branches including a pair of condensers and switching elements are connected across the condenser to shift the relative voltage at said tap, independently of the voltage applied across the resistance.

---

This invention relates to an apparatus for detecting rotating speed and more particularly to an improved apparatus which can detect the rotating speed irrespective of variation in the voltage of a source of supply.

The running speed of railroad trains has been increased remarkably recently so that it becomes impossible to safely control trains by relying upon the vision of drivers. Accordingly, various types of automatic control systems for trains have been devised wherein a speed detector adapted to detect the running speed of a train for providing the difference between the detected speed and a predetermined reference value is the most important element. While there have been proposed a number of speed detectors, none of them are entirely satisfactory from the standpoint of engineering and economy. One of the most serious disadvantages of prior speed detectors is that the accuracy of their measurements is affected by variation in the voltage of a source of supply.

Accordingly it is the principal object of this invention to provide a novel speed detector which can accurately detect rotating speed with simple circuit construction regardless of variation in the supply voltage and hence does not require to use a source of constant voltage.

The invention as to its organization together with further objects and advantages thereof, is best understood by reference to the following description taken in connection with the accompanying drawings, in which:

FIGS. 1 to 3 show circuit diagrams of typical prior apparatus for detecting rotating speed;

FIG. 6 shows a connection diagram of an equivalent circuit of the essential portion of FIG. 4; and FIGS. 7, 8, 9 show circuit diagrams of various modifications of this invention.

Before describing the invention in detail, consideration of some examples of prior speed detectors is believed helpful to more clearly understand this invention.

Figure 1:
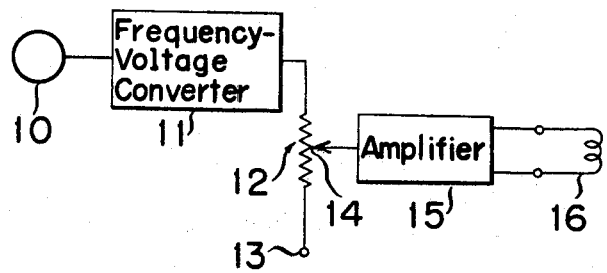

Referring firstly to FIG. 1 illustrating one basic example of the prior art, the rotating speed of an axle (not shown) of a railway car, for example, is detected by deriving an alternating current voltage having a frequency proportional to the speed of said axle from a tachometer generator 10 coupled thereto or by deriving an alternating current voltage induced by the change in magnetic flux caused by the relative rotation between a gear mounted on the axle and a fixed permanent magnet. The alternating current voltage is applied to a frequency-voltage converter 11 to produce a voltage proportional to frequency which is impressed across a resistor 12. This resistor 12 is also supplied from its terminal 13 with a constant direct current voltage which acts as a reference voltage so that the potential at an intermediate tap or point 14 of the resistor 12 will be zero when the detected voltage is equal to the reference voltage; upon deviation of the detected voltage, an even potential will be produced at the point 14 dependent upon the difference between the detected voltage and the reference voltage. The difference voltage is amplified by a suitable amplifier 15 to energize a coil 16 of an output relay 16. As a result, when the difference voltage appearing at the terminal 14 exceeds a certain predetermined value the relay will operate to indicate that the speed of the train is above the predetermined value, or set value.

Figure 2:
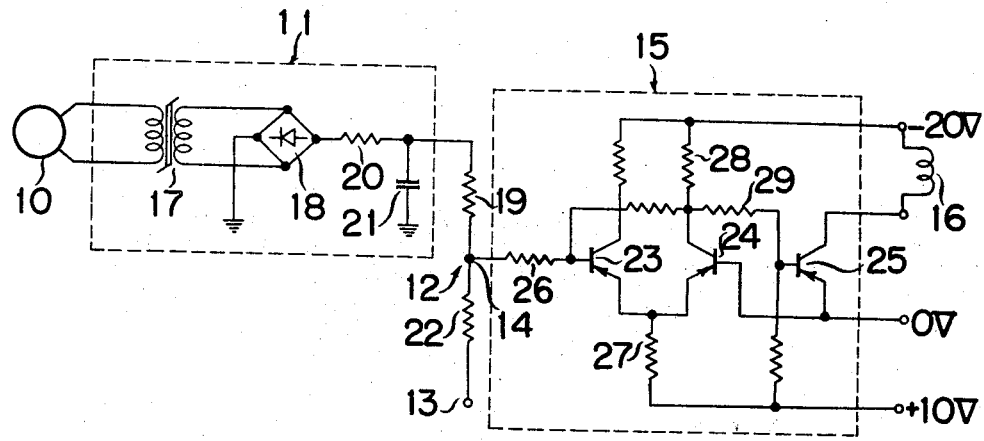

The frequency-voltage converter 11, shown in FIG. 1, is usually a saturable reactor or a monostable multivibrator, as shown in the connection diagrams of FIGS. 2 and 3, respectively. Thus, in FIG. 2 the output of the tachometer generator 10 is supplied to the primary winding of a saturable transformer 17, the secondary winding thereof being connected with A.C. input terminals of a full wave rectifier 18. The positive D.C. output terminal of the rectifier is grounded while the negative D.C. output terminal is connected to one terminal of a resistor 19 through a smoothing circuit including a resistor 20 and a condenser 21. A reference voltage of +10 v., for example, is supplied to a resistor 22 through a terminal 13. Resistors 19, 22 together form the resistance 12 (FIG. 1). Amplifier 15 includes a Schmitt trigger circuit including a pair of PNP resistors 22, 24 and a PNP transistor 25.

As is well known in the art, the saturable transformer 17 produces a voltage at an instant at which the rate of change in the magnetic field is a maximum so that the secondary output voltage thereof will be in the form of a pulse which is solely dependent upon frequency but independent of the magnitude of the output voltage of the tachometer generator. When rectified by the full wave rectifier, the pulse will produce a pulsating voltage proportional to the frequency so that a negative potential proportional to the speed of a train will be applied to the resistor 19 via the smoothing circuit. As described above, since a positive voltage of +10 v. is applied to the terminal 13 of the resistor 22, the voltage impressed upon a resistor 26 will be zero if the magnitude of the detected voltage applied to the resistor 19 is −10 v. corresponding to a running condition wherein the train speed is equal to the set value, whereas the voltage impressed upon the resistor 26 will be positive when the running speed of the train is less than the set value. Thus when the running speed of the train is below the set value the base electrode potential of the transistor 23 is positive to hold it nonconductive. On the other hand the transistor 24 is in its conductive state because the base is connected to a 0 volt terminal and the potential thereof is zero while the emitter is connected to a +10 v. terminal through resistance 27 so that its potential is +10 v. The transistor 25 is in its nonconductive state with its base electrode biassed with +10 v. However, when the speed of the train becomes equal to or exceeds the set value, the potential applied to the resistor 19 will become more negative than −10 v. to apply a zero or negative potential to the base electrode of the transistor 23 thus rendering it conductive. As mentioned above, since the transistor 24 has been conducting the resistor 27 will carry the emitter currents of both of the transistors 23 and 24, which increases the potential drop across the resistor 27. This will result in decrease in the emitter potential until a certain value is reached at which the transistor 24 will become nonconductive. When the transistor 24 is rendered nonconductive, the base potential of the transistor 25 will become more negative than the emitter potential thus rendering the transistor conductive because the base electrode of the transistor 25 is connected to a −20 v. terminal through resistors 28 and 29. Thus the relay coil 16 will be energized by a current flowing from the 0 v. terminal to the 20 v. terminal through the transistor 25 and through the coil 16. Decrease of the train speed below the set value will cause nonconduction of the transistors 23 and 25 to deenergize the relay winding 16. It will be noted that whether the running speed of a train is equal or not equal to the set value, can be detected in a manner as described above; and the accuracy of detection is affected by the stability of the reference voltage impressed upon the terminal 13.

FIG. 3 shows a connection diagram wherein a monostable multivibrator is utilized as the frequency-voltage-converter 11 shown in FIG. 1. The output from a tachometer generator 10 is connected to the base electrode of a PNP transistor 31 through a resistor 32. As shown, a pair of transistors 31 and 33 constitute a Schmitt trigger circuit so that when the output potential of the generator 10 is negative, the transistor 31 will become conductive while the transistor 33 is nonconductive. These cycles of operations are repeated during the respective half cycles of the output from the generator, thus converting the output voltage from the generator 10 into a rectangular wave. This rectangular wave is then converted into an alternating current pulse by the action of a condenser 34, only negative pulses thereof being applied to the base electrode of a PNP transistor 35, through a diode 36, of the polarity as shown, and a resistor 37. Transistor 35, and PNP transistor 38, comprise a monostable multivibrator. As is well known in the art, each time the pulse is impressed, the transistors 35 and 38 are repeatedly rendered conductive to convert the impressed pulse into a pulse wave whose width is determined by a time constant determined by the multivibrator. The pulse produced by the monostable multivibrator and having constant width is applied across a condenser 39, to impress upon a resistor 19, a D.C. voltage proportional to said pulse. Thus the potential impressed upon the resistor 19 is a potential proportional to the running speed of a train. The reference voltage from terminal 13 is again compared as in the cases shown in FIGS. 1 and 2. Again, the accuracy of detection is dependent upon the stability of the reference voltage of +10 v. as well as the converter circuit voltage of −20 v. Thus the accuracy of detecting circuits shown in FIGS. 2 and 3 is not satisfactory. If the speed of the train is extremely high, for example, over 250 kilometers per hour, very high accuracy of the detecting circuit is required in order to safely and accurately control the speed of such a high train speed. However, a highly accurate detecting circuit requires an elaborate and hence expensive source of constant voltage requiring a great number of component parts which increases the chance of fault and decreases reliability of the speed detecting device.

These disadvantages can be eliminated by this invention which comprises means to generate an A.C. voltage in response to the rotation of a rotating body, means to convert said A.C. voltage into a pulse having a constant width at each alternation of said A.C. voltage, a resistor through which a continuous current from a supply source is always flowing, a switching element connected in parallel with said resistor and adapted to be opened and closed in response to the output pulse from said converting means to shift the potential of said resistor in proportion to the number of opening and closing per unit time, and means operative to detect the number of revolutions of said rotating body when a potential at a predetermined point of said resistor reaches a predetermined value.

Figure 4:
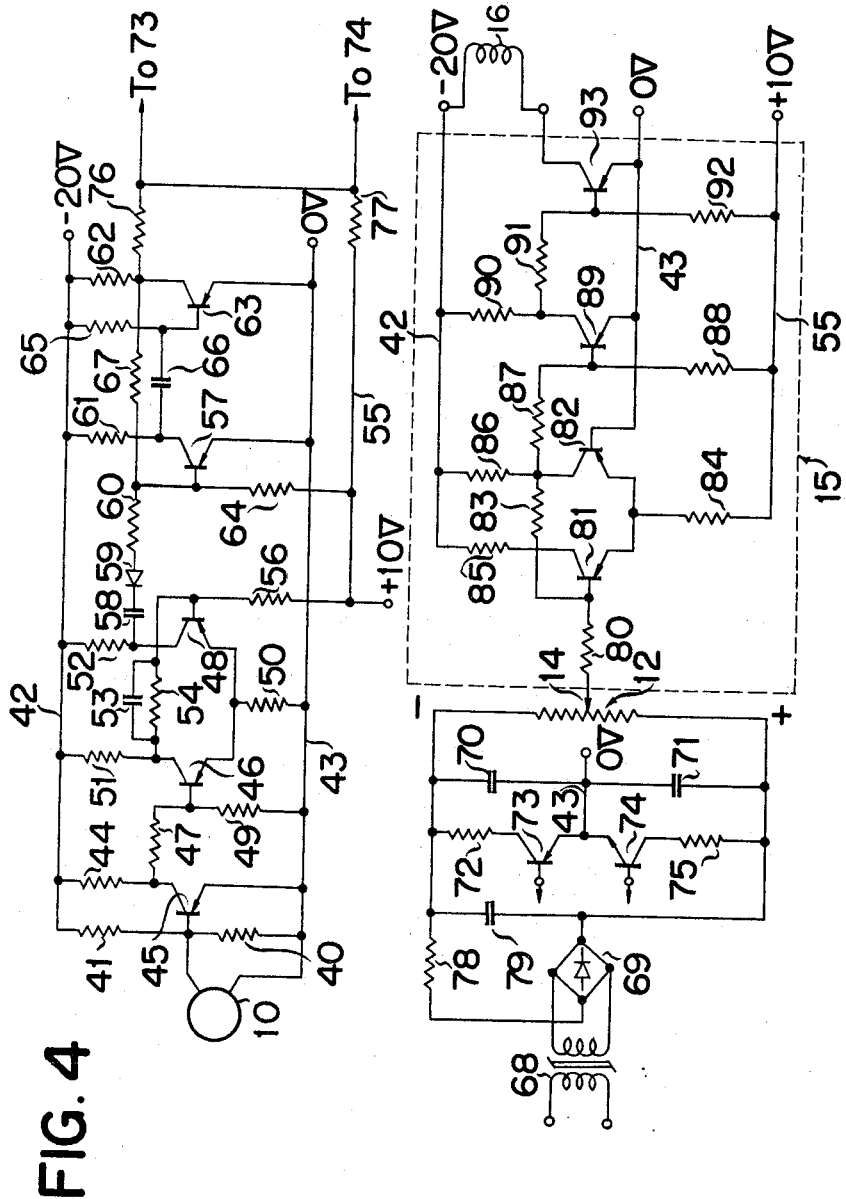
FIG. 4 shows a circuit diagram of one example of an apparatus for detecting rotating speed embodying the principle of this invention.

Referring now to FIG. 4 which shows one preferred embodiment of this invention, the output terminals of tachometer generator 10 are connected in parallel with a resistor 40 which is connected in series with a resistor 41, across supply conductors 42 and 43, respectively connected to a −20 v. and 0 v. terminals. Across resistors 41 and 40 is connected a series combination comprising a resistor 44, and a PNP transistor 45, the base electrode thereof being connected to a junction between resistors 40 and 41. The collector electrode of the transistor 45 is connected to the base electrode of a transistor 46 through a resistor 47 and also to the conductor 43, via a resistor 49. A pair of PNP transistors 46, and 48, constitutes a Schmitt trigger circuit and the emitter electrodes of both of the transistors 46 and 48, are connected to the conductor 43, through a resistor 50, while the collector electrodes are connected to the conductor 42, respectively through resistors 51 and 52. Also the collector electrode of the transistor 46 is connected to the base electrode of the transistor 48 via a parallel combination including a condenser 53, and a resistor 54, said base electrode being connected to a conductor 55, maintained at +10 v. via a resistor 56. Further, the collector electrode of the transistor 49 is connected to the base electrode of a PNP transistor 57 through a condenser 58, a diode 59, poled as shown, and a resistor 60. A pair of series combinations each including a resistor 61, and the transistor 57, and a resistor 62 and a transistor 63 respectively, which are connected across conductors 42 and 43, constitute a monostable multivibrator. The base electrode of the transistor 57 is connected to the conductor 55, through a resistor 64, whereas the base electrode of the transistor 63 is connected to the conductor 42, via a resistor 65. As shown, a condenser 66, is connected between the collector electrode of the transistor 57, and the base electrode of the transistor 63, and the collector electrode of the transistor 63, is connected to the base electrode of the transistor 57, through a resistor 67.

An alternating current supplied from a source, not shown, through a transformer 68, is converted into direct current by a full wave rectifier 69. The direct current output from the rectifier is applied across resistor 12 with its upper terminal negative and the lower terminal positive. A series circuit comprising condensers 70 and 71, and a second series circuit comprising a resistor 72, a PNP transistor 73, an NPN transistor 74 and a resistor 75, in the order mentioned, are connected across resistance 12. The junction between the emitter electrodes of the transistors 73 and 74 is connected to the junction between condensers 70 and 71, and also to the earth. Further the base electrodes of the transistors 73, 74 are connected in parallel, and to the collector electrode of the transistor 63, via a resistor 76 and to the conductor 55, through a resistor 77. A resistor 78 is connected in series with the output D.C. terminals of the full wave rectifier 69, and a condenser 79 is connected across the D.C. terminals. Slidable arm 14 provided at approximately the center of the resistor 12 is connected through a resistor 80, to the base electrode of a PNP transistor 81, forming a Schmitt trigger circuit together with another PNP transistor 82, and also to the collector electrode of the PNP transistor 82, through a resistor 83. The emitter electrodes of the transistors 81 and 82 are connected to a +10 v. terminal via a resistor 84, whereas the collector electrodes of these transistors are connected to a −20 v. terminal respectively through resistors 85 and 86. As shown, the base electrode of the transistor 82, is connected to a 0 v. terminal while the collector electrode thereof is connected to the +10 v. terminal through resistors 87 and 88. The base electrode of a PNP transistor 89 is connected between the junction of these resistors 87 and 88. The transistor 89 is connected across the 0 v. and −20 v. terminals through a resistor 90. Further the collector electrode of the transistor 89 is connected to the +10 v. terminal through resistors 91 and 92 and the junction between these resistors is connected to the base electrode of a PNP transistor 93 which is connected across 0 v. and −20 v. terminals through coil 16 of the relay.

Figure 5A:
FIG. 5 shows a graph useful to explain the operation of the invention.

The operation of this invention will be described by referring to FIG. 5. The tachometer generator 10 coupled to an axle of a train will generate a voltage having a wave form as shown in FIG. 5a which is proportional to the number of revolutions of the axle and applied across the resistor 40 to produce a potential difference thereacross. This potential difference, superposed upon the voltage drop across resistors 41, and 40, caused by a current flowing between −20 v. and 0 v. conductors, will be impressed upon the base electrode of the transistor 45, to vary the conduction thereof dependent upon the voltage of the generator 10. Stated in another way the output voltage of the generator 10 is amplified by the transistor 45. While a current is always flowing between conductors 42, and 43 through a circuit including resistors 59, 47 and 44, conduction of the transistor 45 will result in the superposition of its collector current upon the resistor 44, whereby the potential drop across it will be increased to shift the base potential of the transistor 46 in a positive direction. Thus the base potential will be made higher than the emitter potential which is now maintained at 0 v. to render the transistor 46 nonconductive. On the other hand, as the base electrode of the transistor 48 is supplied with a negative potential from the conductor 42, via resistors 50 and 51, the transistor 48 is in its conductive condition.

Figure 5B:
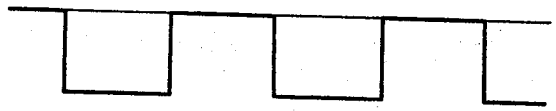
Figure 5C:
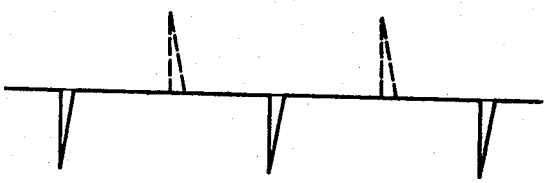

Assuming now that the output voltage of the generator 10 is positive, the transistor 45 will be turned off to cut off the superposed current flowing through the resistor 44, thus shifting the base potential of the transistor 46, in a negative direction. When the base potential becomes lower than the emitter potential the transistor 46 will be turned on to pass current between conductor 43 and 42, through the resistor 50, transistor 46, and resistor 51 to increase the potential drop across the resistor 50. More particularly, conduction of the transistor 46 will add the current flowing through the resistor 50 to that caused by the conduction of the transistor 48, whereby the emitter potential of the transistor 48 will be decreased more than the base potential, to render it nonconductive. Thus the collector potential of the transistor is equal to 0 v. when it is conductive whereas it is shifted in a negative direction by −20 v. on the conductor 42 when it is nonconductive. It will be understood that the collector potential of the transistor 48, forms the output voltage of the Schmitt trigger circuit having a wave form as shown in FIG. 5b, which means that the Schmitt trigger circuit acts to convert the output voltage of the generator into a square wave. When a square wave as shown in FIG. 5b is impressed upon the condenser 58, the potential of the left hand terminal will be quickly shifted from 0 v. to −20 v. so that charging current will flow. Thus the terminal voltage of the condenser will change between the negative and positive directions, i.e., in the form of pulses, at instants when the collector potential of the transistor 48, changes from 0 v. to −20 v., and from −20 v. to 0 v., respectively, as shown in FIG. 5c. Thus the condenser 58 acts to convert the output voltage of the Schmitt trigger circuit into short pulses. The positive spikes of the pulse produced by the condenser 58 are eliminated by the diode 59 so that only the negative spikes are applied to the base electrode of the transistor 57 via the resistor 60.

Figure 5D:
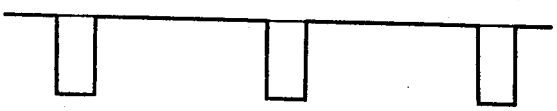

As is well known in the art the monostable multivibrator comprising transistors 57 and 63 will generate a pulse having a constant width or time duration determined by its time constant whenever a triggering pulse input is supplied thereto. More particularly, each time a pulse produced by the condenser 58 is applied to the base electrode of the transistor 57, the base electrode will be connected to the −20 v. conductor 42, through the condenser 58, to render the transistor 57 conductive and to block the transistor 63. By alternately repeating this cycle of operations pulses having a constant width as shown in FIG. 5d are derived from the collector electrode of the transistor 63. The number of these pulses is proportional to the number of revolutions of an axle of a train, in other words the number of pulses in a definite time interval increases as the number of revolutions of the axle increases. Since the width of the pulse is constant, the mean value of the pulse voltages is proportional to the number of revolutions of the axle so long as the voltage of the source remains constant.

According to this invention these pulses are applied to the base electrodes of transistors 73 and 74, through the resistor 76. Inasmuch as the base electrodes of these transistors are connected to the conductor 55 of +10 v. through the resistor 77, the PNP transistor 73 will be nonconductive whereas the NPN transistor 74 will be conductive. In this condition as the negative pulse from the transistor 63 is applied to the base electrodes of respective transistors 73 and 74, the base potential of the transistor 73 will become negative with respect to its emitter potential thus rendering the transistor 73 conductive and the transistor 74 nonconductive only while the pulse is impressed, that is, only during the time interval corresponding to the pulse width. As has been pointed out, the transistors 73 and 74 are connected in series across the resistor 12 which is energized by a constant D.C. voltage supplied from the full wave rectifier 69. Thus transistors 73 and 74 constitute a bridge circuit together with the resistor 12, a simplified equivalent circuit thereof being depicted in FIG. 6. More particularly resistors $R_A$ and $R_B$ connected in the bridge circuit energized with a constant D.C. potential having a polarity as shown represent the internal resistances of transistors 73 and 74 shown in FIG. 4 are rendered alternatively conductive and nonconductive by the same signal coming from the transistor 63, which is equivalent to varying, in unison, the values of the resistances $R_A$ and $R_B$ shown in FIG. 6 in such a manner as to increase the value of the resistance $R_A$ while decreasing the value of the resistance $R_B$. In the absence of the pulse coming from the transistor 63, the transistor 74 is in its conductive state whereas the transistor 73 is nonconductive so that the values of the resistances $R_A$ and $R_B$ are equal to infinity and zero respectively. The potential at point B of resistance 12, FIG. 6, is equal to zero while at point C it is equal to $-V_0$ volt. When a signal is impressed upon the base electrodes of the transistors 73 and 74 transistor 73 will be rendered conductive and transistor 14, nonconductive during the time interval corresponding to the pulse width so that the values of the resistance $R_A$ and $R_B$ will then be zero and infinity, respectively. In this case the potential at resistance 12 will be equal to zero volt at point C and $+V_0$ at point B.

As the number of revolutions of the axle increases, the number of pulses per unit time will increase so that the frequency at which the transistor 73 is made conductive will increase. Thus the number of times at which the point C of the resistor 12 of FIG. 6 is at zero volt and the point B is at $+V_0$ volt will gradually increase. The potential of an intermediate point A of the resistor 12 will change in a rectangular wave form when the potentials at the points B and C are repeatedly varied between 0 volt and $\pm V_0$ volt. In order to avoid this, in accordance with this invention, condensers 70 and 71 are connected in series across the resistor 12 as shown in FIG. 4 to smooth out the potential drop across the equivalent resistors $R_A$ and $R_B$. With this connection the potential drop across resistors $R_A$ and $R_B$ will become a D.C. voltage corresponding to the mean value of the number of pulses so that the potential at the point A on the resistor 12 will become a D.C. voltage having a value proportional to said mean value.

Thus, in the absence of an input pulse on the transistors 73 and 74, FIG. 4, the voltage of the poinnt A of the resistor 12 shown in FIG. 6 will be represented by $$-\frac{R_A}{R_A+R_B} \cdot V_0 \qquad (1)$$

But as the number of input pulses increases, the voltage of the point A will be shifted in a positive direction and can be represented as follows when the number of pulses reaches the maximum:

$$+\frac{R_B}{R_A+R_B}\cdot V_0 \tag{2}$$

Since the number of output pulses from the monostable multivibrator is proportional to the number of revolutions of the generator 10, it is obvious that the voltage at point A varies in proportion to the number of revolutions.

While the voltage of the point A is applied to a differential amplifier adapted to detect 0 volt condition, in accordance with this invention the slidable arm 14 is so positioned on the resistor 12 that zero volt will appear at the arm when the speed is increased to a set value. As the base electrode of the transistor 82, contained in the amplifier is connected to the 0 v. terminal the transistor is in its conductive state with zero volt base potential and 10 volts emitter potential. Until the speed of a train reaches a set value to be detected, as mentioned above, the potential of the slidable arm 14 on the resistor 12 is negative and this negative potential is applied to the base electrode of the transistor 81 through the resistor 80. However as the emitter of this transistor is impressed with a voltage of +10 v., this transistor will become conductive to pass current from +10 v. terminal to −20 v. terminal through the resistor 84, transistor 81 and resistor 85. As mentioned above, since the transistor 82 has been conducting, the current flowing through the resistor 84 is increased as the result of conduction of the transistor 81 so that the transistor 82 will be rendered nonconductive. As a result the transistor 89 will be rendered conductive because its base electrode is connected to −20 v. terminal through resistors 86 and 87. In this case the base electrode of the transistor 93 is connected to the 0 v. terminal through the resistor 91 and through the transistor 89, the potentials of its emitter and base electrodes are equal, thus rendering the transistor 93 nonconductive. Accordingly the coil 16 is not energized.

As the train speed is gradually increased until finally the set value is reached, the potential at the slidable arm 14 will change from negative to positive potential as described above. When the potential of the slidable arm 14 becomes zero volt the transistor 81 will be rendered nonconductive while the transistor 82 conducts. As a result the transistor 89 will be rendered nonconductive to connect the base electrode of the transistor 93 to the −20 v. terminal through resistors 90 and 91, thus rendering the transistor conductive. Thus, a current will flow from the 0 v. terminal to the −20 v. terminal through the transistor 93 and the coil 16 of the relay to energize the relay to detect the fact that the running speed of the train has reached the speed to be detected.

The effect of variation of source voltage upon the operation of the apparatus shown in FIG. 4 will now be considered hereunder. Since the base electrode of the transistor 82 comprising the amplifier circuit is grounded, the transistor 81 will always become conductive whenever its base electrode potential becomes zero volt, thus operating quite independently of the variation in the source voltages of −20 v. and +10 v., as is well known to those skilled in the art of differential amplifiers. Moreover, even when −20 v. and +10 v., which are the source voltages for the Schmitt trigger circuit, monostable multivibrator, etc., vary, the width of the output pulse from the monostable multivibrator is never affected thereby because the width of the pulse is determined solely by the time constant of the condenser 66. Thus, for example, when the transistors 57 and 63 are nonconductive and conductive, respectively, a current will flow from the 0 v. terminal to the −20 v. terminal through a circuit 61 to charge up the condenser 66 to 20 volts with its left terminal negative and right terminal positive. Upon receiving a negative pulse at its base electrode at this time, the transistor 57 will be rendered conductive to connect its collector electrode to the 0 v. terminal to change the potential of the left terminal of the condenser 66 to zero volt. As a result the potential of the right terminal of the condenser will be increased to +20 volts.

Figure 5E:
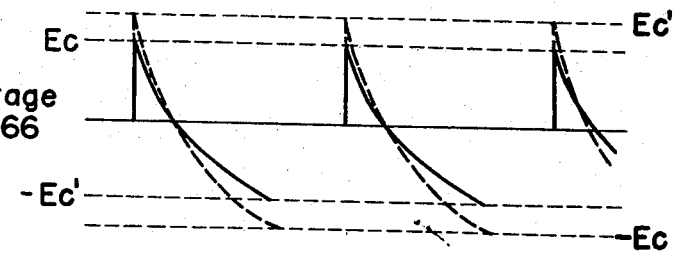

As shown in FIG. 5e, the voltage of the condenser drops exponentially towards the asymptote of −20 v. At an instant when the voltage of the condenser 66 has just dropped to zero volt the transistor 63 will be again rendered conductive to bring its collector potential to zero volt. This change is fed back to the transistor 57 through the resistor 67 to render the transistor 57 nonconductive. Thus it will be noted that transistors 57 and 63 are restored to a state at which the impulse is not yet applied. Summarizing the above, the pulse width is determined by the time interval between the instant at which the charged condenser 66 begins to discharge and the instant at which the condenser voltage becomes zero, as shown in FIG. 5d and FIG. 5e.

If it is assumed that V represents the base potential of the transistor 63 or the voltage of the right terminal of the condenser 66 and that $E_c$ represents the source voltage then it can be shown that the condenser voltage changes following a curve represented by $$V=-E_c\left(1-2\epsilon^{-\frac{t}{Rc}}\right) \tag{3}$$

By solving the equation to obtain the time at which $V=O$, $$0=-E_c\left(1-2\epsilon^{-\frac{t}{Rc}}\right) \tag{4}$$

Hence the time $t$ obtained from the equation $$t=1-2\epsilon^{-\frac{t}{Rc}} \tag{5}$$

is the time at which the condenser voltage is equal to zero. As can be clearly noted from Equation 5 this time $t$ is quite independent of the source voltage $E_c$. Also as shown in FIG. 5e even when the source voltage $E_c$ changes to $E_c'$, the condenser voltage always reaches zero volt at the same instant, thus making the pulse width, FIG. 5d, independent of the variation in source voltage.

With regard to the amplitude of the pulse, the amplitude itself is of course the same as that of the source voltage so that the amplitude of the pulse varies as the source voltage varies. However, since the transistors 73 and 74, which are supplied with the output pulse from the monostable multivibrator, act as switching elements in sufficiently saturated regions, their operating points are determined solely by the pulse width and are quite independent of its amplitude. Thus the variation in the −20 volt source voltage does not affect the operation of the transistors 73 and 74, and hence the operation of the succeeding detecting circuit. Further as the source of +10 v. is utilized solely as a source for supplying biassing potential to transistors, variation in said source voltage does not materially affect the accuracy of detection.

It is also to be remembered that the full wave rectifier merely acts to supply current to the bridge circuit, and that the slidable arm 14 is positioned on the resistor 12 such that the potential of the arm will reach zero when the speed of a train reaches the speed to be detected. In other words, the slidable arm is positioned as to divide the voltage across the resistor 12 in the ratio of $R_A:R_B$. Assuming now that the current supplied by the rectifier 69 is increased by $\alpha$ times owing to the variation in the source voltage supplied to the transformer 68, caused by some reason, the potential drop across the resistor 12 will also be increased by $\alpha$ times, the potential at the slidable arm is still determined by the ratio $$\alpha IR_A/\alpha IR_B=R_A/R_B$$

thus no change in the potential appearing at the slidable arm 14 will occur. This means that variation in the source voltage does not affect the speed to be detected.

The detecting device embodying this invention and shown in FIG. 4 can detect the speed of a train and like vehicles with high accuracy regardless of variations in the source voltage and without the necessity of using any constant voltage device.

Figure 8:
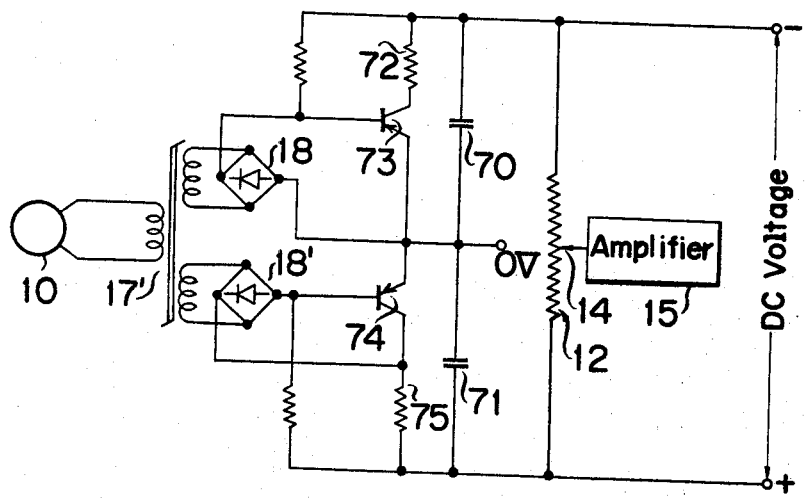
Figure 9:
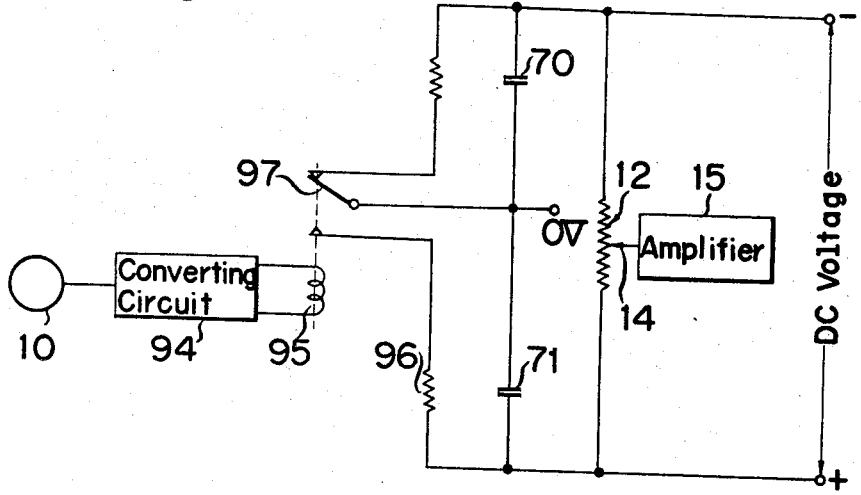

This invention is not limited to the circuit shown in FIG. 4 but may be carried out in various ways as illustrated by embodiments shown in FIGS. 7, 8 and 9. Corresponding parts of FIGS. 2, 4 and 7 are designated by tehe same reference numerals. In the modification shown in FIG. 7 the monostable multivibrator in FIG. 4 is replaced by saturable transformer 17 which is similar to that used in FIG. 2 in order to convert the output voltage from generator 10 into pulses. It will be recalled that the input signal to transistors 73 and 74 only need be of constant pulse width and provide a number of pulses proportional to the speed to be detected, and that the shape of the pulse is immaterial. In both FIGS. 4 and 7 the transistor 73 is of the PNP type and the transistor 74 the NPN type. FIG. 8 shows a modification wherein both transistors are of the PNP type, in which case a saturable transformer 17 is provided which has two secondary windings each connected to full wave rectifiers 18 and 18′, respectively. The positive D.C. output terminal of the full wave rectifier 18 is connected to the base electrode of a transistor 73′ whereas the negative output terminal of the full wave rectifier 18′ is connected to the base electrode of a transistor 74′ so that the device shown in FIG. 8 can operate in the same manner as those shown in FIGS. 4 and 7.

FIG. 9 shows a still further modification of this invention wherein a mechanical relay is used instead of transistors to effect switching operation. More particularly the output voltage of a generator 10 is converted into a pulse having constant width by the action of a converting device 94 which may comprise a combination of Schmitt trigger circuit and a monostable multivibrator circuit as shown in FIG. 4 or a saturable transformer as shown in FIG. 2. The output pulse from converting circuit 94 is utilized to energize a coil 95 of a relay to switch its contact 97 to the lower contact, thus providing the same function as those described in connection with previous embodiments. Resistances 96, 96′ correspond to resistances $R_A$, $R_B$ (FIG. 6), respectively.

As can be clearly noted from the foregoing description this invention provides a novel speed detecting apparatus which can eliminate not only the disadvantages caused by variation in the source voltage but also expensive constant voltage devices. Thus, the detecting apparatus can be made at low cost and yet with high accuracy of detecting speed. Accordingly the novel apparatus is particularly suitable to effect automatic control of high speed trains.

While the above description has been directed to the application of detecting train speed, it should be understood that this invention can be equally applied to detect the speed of rotation of any rotating body and that various changes and modifications can be made without departing from the true spirit and scope of the invention as defined in the appended claims.

What is claimed is:

1. An apparatus for detecting the number of revolutions of a rotating body comprising:
    means to generate an alternating current voltage dependent upon the number of revolutions of said rotating body;
    means to convert said alternating current voltage into pulses of constant width each time said voltage alternates;
    a source of current;
    a resistor connected to said source to have a continuous current flowing therethrough from said source of current, said resistor having a tap point thereon;
    means to shift the potential of said tap point of said resistor, said potential shift means including two circuit branches each connected across said resistor, one branch including serially connected switching elements, and the other branch including serially connected capacitors, the junction points of the serially connected elements and capacitors, respectively, of said branches being grounded, and means controlling said switching elements to close and open in response to the output pulses from said converting means; and
    means sensing the potential of the tap of said resistor.

2. Apparatus according to claim 1 wherein said converting means comprises a Schmitt trigger circuit and a monostable multivibrator, and the switching elements of said shifting means comprise a pair of transistors controlled by the output pulses from said monostable multivibrator.

3. The apparatus according to claim 1 wherein said converting means comprises a saturable transformer, having a primary winding connection to be energized by the output of the generating means, and a pair of secondary windings; a pair of rectifiers, one each respectively connected to one set of two A.C. output terminals of said transformer.

4. The apparatus according to claim 1 wherein said switching elements comprise a mechanical relay having a coil connected to be energized by the output of the converting means and single pole-double throw contacts and a moving switch member, said switch member being grounded and each of the fixed contacts being connected to the end terminals of the resistor respectively.

5. Apparatus as claimed in claim 1 wherein said sensing means sense a predetermined value of potential at said tap to detect when the number of revolutions of said body exceeds a predetermined value.

References Cited
UNITED STATES PATENTS 3,109,140  10/1963  Chin et al. _____ 317—5 X LEE T. HIX, *Primary Examiner.*

U.S. Cl. X.R.

317—148.5; 324—70; 246—182; 307—260, 265, 273, 289, 290